United States Patent [19]

Prato

[11] Patent Number: 5,132,167
[45] Date of Patent: Jul. 21, 1992

[54] BONDED LAMINATE HAVING HIGH ANTI-PIERCING CHARACTERISTICS

[75] Inventor: Filippo Prato, Erba, Italy

[73] Assignee: Tecnocompositi S.p.A., Milan, Italy

[21] Appl. No.: 740,667

[22] Filed: Aug. 2, 1991

Related U.S. Application Data

[63] Continuation of Ser. No. 534,268, Jun. 7, 1990, abandoned.

[30] Foreign Application Priority Data

Jun. 9, 1989 [IT] Italy ................................ 20833 A/89

[51] Int. Cl.⁵ ......................................... B32B 7/00
[52] U.S. Cl. ..................................... 428/251; 428/252; 428/280; 428/282; 428/284; 428/285; 428/287; 428/902; 428/911
[58] Field of Search ............... 428/251, 252, 280, 282, 428/284, 285, 287, 902, 911, 246

[56] References Cited

U.S. PATENT DOCUMENTS

| | | | |
|---|---|---|---|
| 3,000,772 | 9/1961 | Lunn | 428/911 |
| 3,722,355 | 3/1973 | King | 428/911 |
| 4,316,404 | 2/1982 | Medlin | 428/911 |
| 4,522,871 | 6/1985 | Armellino et al. | 428/911 |
| 4,574,105 | 3/1986 | Donovan | 428/911 |
| 4,613,535 | 9/1986 | Harpell et al. | 428/284 |
| 4,623,574 | 11/1986 | Harpell et al. | 428/284 |
| 4,678,702 | 7/1987 | Lancaster et al. | 428/911 |
| 4,681,792 | 7/1987 | Harpell et al. | 428/911 |
| 4,732,803 | 3/1988 | Smith, Jr. | 428/212 |
| 4,820,568 | 4/1989 | Harpell et al. | 428/911 |
| 4,883,700 | 11/1989 | Harpell et al. | 428/911 |

FOREIGN PATENT DOCUMENTS 0002953 12/1978 European Pat. Off. .

*Primary Examiner*—James J. Bell
*Attorney, Agent, or Firm*—Stevens, Davis, Miller & Mosher

[57] ABSTRACT

A bonded laminate having high anti-piercing characteristics, which comprises a plurality of fiber material layers impregnated with a thermosetting resin and a plurality of fiber material layers impregnated with a thermoplastic resin.

9 Claims, No Drawings

BONDED LAMINATE HAVING HIGH ANTI-PIERCING CHARACTERISTICS

This application is a continuation of application Ser. No. 07/534,268, filed Jun. 7, 1990, now abandoned.

BACKGROUND OF THE INVENTION FIELD OF THE INVENTION

The present invention relates to a bonded laminate having high anti-piercing characteristics.

More in particular, the present invention relates to a bonded lamiante endowed with high anti-piercing characteristics and to its utilization for preparing armor systems for the protection against bodies endowed with high kinetic energy.

DISCUSSION OF THE PRIOR ART

Laminar structures capable of resisting the piercing or penetration of bodies endowed with high kinetic energy such as stones, bullets, splinters, etc. are known in literature.

U.S. Pat. No. 2,789,076, British patent 1,291,821 and French patent 1,163,606 describe structures of this type, which are obtained by bonding with one another a plurality of glass fiber fabrics or of man-made fiber fabrics and by using, as a binder, thermosetting resins such as polyester resins, epoxy resins, phenolic resins, phenol-formaldehyde resins and the like.

These bonded structures, although exhibiting an excellent resistance to piercing, are affected by a few drawbacks which limit the use thereof in some specific protection sectors.

In fact, it was observed that when one of these laminar structures is hit by a body endowed with a high kinetic energy, such as a bullet, it undergoes a deformation and/or a break which concerns a much greater area than the shot impact area.

Since the extended break or deformation remarkably reduces the anti-piercing characteristics of the bonded laminate, it follows that these structures are not able to withstand a series of concentrated or little-spaced impacts such as those which could be caused by bullets shot by an automatic repeater. By consequence, the safety of those who wear a bullet-proof jacket manufactured from bonded structures like the ones described hereinbefore is not secured as it ought to be.

Multilayer structures consisting of a plurality of glass fiber fabrics or of man-made fiber fabrics coated with thermoplastic polymers are known too. U.S. Pat. No. 3,000,772 describes piercing-resistant laminates obtained by superimposing and binding together polyethylene layers and glass fiber fabric layers; polyethylene permits also to obtain the bonding among the glass fiber fabric layers.

In particular, European patent No. 49,014 describes a piercing-resistant non-metallic reinforced panel prepared by alternated superimposition of thermoplastic resin layers and of high-tenacity man-made fiber fabric layers such as, e.g. aramidic fiber fabric layers, in which the structural support comprises projections which from the thermoplastic resin layer insert themselves and pass through the interstices of the weft and warp interlacements of the fabric and bond to corresponding projections of at least another upper and/or lower thermoplastic resin layer; the interconnection between said projections and said thermoplastic material layers form a cell-like structure, the cavities of which receive and freely encapsulate the fabric yarns without penetrating them and impregnating the fibers.

However, also these solutions do not permit to completely and exhaustively meet all the requirements of the sector and the specifications of the contract. In particular, the thermoplastic resin, and more in particular the polyethylene, tends to soften under the action of heat, what causes the flowing of the fibers and therefore a decrease in the laminate resistance to piercing. Said decrease can reach values even higher by 50% than the normal value.

DISCLOSURE OF THE INVENTION

The Applicant has now found that the above-cited drawbacks can be eliminated by combining together a laminate based on thermoplastic resins and a laminate based on thermosetting resins.

Thus, an object of the present invention is a bonded laminate having high anti-piercing characteristics and comprising a plurality of fiber material layers impregnated with a thermosetting resin and a plurality of fiber material layers impregnated with a thermoplastic resin.

The laminate forming the object of the present invention exhibits, the thickness being equal, a minimum deformation in consequence of an impact, substantially limited to the surface of the blunt instrument, and a resistance to high temperatures, which is by far higher than the one of a laminate comprising only a thermoplastic resin.

The fiber material utilized in the bonded laminate object of the present invention can consists of glass fibers or of man-made fibers. High-tenacity and high-elastic modulus man-made fibers, and in particular the aramidic fibers such as the Kevlar $^R$ fibers, are preferred. The fiber material can be the same in the two parts which form the final bonded laminate, or it can be different, as a function of the required properties. The fiber material can be used both in the form of fabrics and in the form of pressed and needled felts, wherein the fibers are randomly distributed in all directions.

The thickness of the bonded laminate of the present invention generally ranges from 5 to 50 mm, at least 50% of which being composed of a plurality of fiber material layers impregnated with a thermosetting resin and less than 50% being composed of a plurality of fiber material layers impregnated with a thermoplastic resin.

In particular, if $n_A$ indicates the number of layers impregnated with a thermosetting resin and $n_B$ indicates the number of layers impregnated with a thermoplastic resin, it is advisable to operate with $n_A/n_B$ ratios ranging from 1.1 to 20; the sum of $n_A+n_B$ being in the range of from 5 to 50.

According to a preferred embodiment of the bonded laminate forming the object of the present invention, the portion of laminate impregnated with a thermoplastic resin is composed of a plurality of layers, each layer consisting of a fabric prepared from aramidic fiber yarns incorporated in a matrix having a cell-like three-dimensional elastic structure and obtained by hot-pressing a thermoplastic resin inserted among the fabric layers and consisting of polyethylene films having a thickness of less than 0.1 mm.

Said cell-like elastic structure consists of thermoplastic material projections which extend through the interstices of the weft and warp interlacements and bond with the corresponding upper and lower projections, thereby forming continuous transversal reinforcing chains; while the portion of thermoplastic matrix not extending through said interstices forms a thin laminar film interconnecting all said continuous chains. The fabric yarns are contained and freely encapsulated in the cells of said cell-like structure, without any penetration of the thermoplastic material into the yarn or impregnation of the fibers. Such a structure is described in European patent No. 49,014, the content of which is an integrant part of the present specification.

Any thermosetting resin is utilizable for preparing the laminate of the present invention; illustrative examples of possible thermosetting resins are unsaturated polyester resins, phenolic resins, resorcin resins, epoxy resins, phenol-formaldehyde resins etc.

Analogously, any thermoplastic resin is utilizable for preparing the laminates of the present invention, although the preferred ones are the polyolefins such as polyethylene, polypropylene, ethylene-propylene copolymers, etc.

Both the thermosetting resins and the thermoplastic resins are used in amounts ranging from 5 to 50% by weight calculated on the final product.

The textile material can be impregnated with the thermoplastic or thermosetting resin, or the resin can be added to the textile material by means of lamination.

The layer containing the thermosetting resin and the layer containing the thermoplastic resin, which form the bonded laminate object of the present invention, can be bonded with each other by means of any technique known to those skilled in the art.

For example they can be bonded by hot-pressing, or using an adhesive compatible with the laminate materials. The adhesive can be the same thermoplastic or thermosetting resin which is utilized for preparing the laminate.

According to a preferred embodiment, the bonding between the two layers is obtained by interposing between them a cellulose film which is spread, on both surfaces, with a thermomelting adhesive based on a SIS (styrene-isoprene-styrene) copolymer, and by subjecting the resulting laminate to pressure.

In order to better understand the present invention and to reduce it to practice, an illustrative but not limitative example is given hereinafter.

EXAMPLE

A first laminate (A) was prepared, which consisted of:
11 layers of a fabric of aramidic fiber (KEVLAR) yarns having a tensile strength of 180 kg/cm, an elongation at break of 6% and a count of 1,580 dtex HT; the fabric consisted of $6.7 \times 6.7$ yarns per $cm^2$ and had a weight of about 230 g per $m^2$; and
12 layers of a polyethylene film having a thickness of 0.08 mm.

The laminate was subjected to a heat treatment under pressure at a temperature of 185° C. and a pressure of 5.5 kg/$cm^2$, during 15 minutes.

Separately, a second laminate (B) was prepared, which consisted of 22 layers of a fabric like the one of the first laminate, impregnated with an unsaturated polyester resin; the resin content was equal to 14% by weight.

Laminate (B) was then subjected to a heat treatment under pressure at a temperature of 110° C. and a pressure of 100 kg/$cm^2$, during 15 minutes.

The two laminates were then made to adhere to each other using the biadhesive layer having a thickness of 0.10 mm.

The resulting bonded laminate was subjected to balistic tests. In fact, in spite of the possibility to subject these anti-piercing laminates to simulative laboratory tests, when it is a question of certainly ascertaining the validity of a bullet-resisting article, the only valid test is surely the test with fire-arms, the interpretation of the results being very easy also for those who are not skilled in the art. For these tests there was chosen a revolver of caliber 357 Magnum, make S. & W., model 357 Magnum, having a barrel length of 4 inches, and commercial cartridges Geco 357 M.P., the shots of which, having a pointed shape and a steel casing and weighing 10.2 grams, have a speed of the order of 380-420 m/second.

The following test conditions were employed: shot distance = 5 m; impacts perpendicular to the test specimens surface; test specimens retained by means of rubber bands and supported on a flat plasteline support; dimensions of the specimens = $200 \times 200$ mm.

The plasteline had a height of 30 cm, a length of 25 cm and a thickness of 10 cm and such a consistence that the drop of a hemispherical steel body weighing 1 kg and having a diameter of 45 mm, from a height of 2 m, caused a deformation equal to $25 +/- 3$ mm.

For comparative purposes, two laminates (1) and (2) were prepared, which were like laminate (A) and laminate (B), respectively, having the same number of layers as the bonded laminate of the example.

The results of the tests were as follows:

| CHARAC-TERISTICS | BONDED LAMINATE OF THE EXAMPLE | COMPARA-TIVE LAMI-NATE 1 | COMPARA-TIVE LAMI-NATE 2 |
|---|---|---|---|
| Average deformation of the laminate | 20 mm | 27 mm | 24 mm |
| Average deformation of plasteline | 24 mm | 34 mm | 29 mm |
| Average distance of the the shots | 55 mm | 55 mm | 65 mm |
| Damaged area | 1,955 $mm^2$ | 1,955 $mm^2$ | 7,850 $mm^2$ |

For the temperature resistance tests, the following methodology was employed.

The test specimens to be tested were placed onto a plasteline having the same dimensions and the same consistence as indicated hereinbefore and were retained by means of rubber bands. It was fired with the revolver as defined above, at a distance of 5 metres. The plasteline deformations obtained after treatment of the specimens at 60° C. for 6 hours were as follows:

BONDED LAMINATE OF THE EXAMPLE: 27 mm
COMPARATIVE LAMINATE 1: 26 mm
COMPARATIVE LAMINATE 2: 31 mm.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A bonded laminate having high anti-piercing characteristics and comprising a plurality of fiber material layers impregnated with a thermosetting resin and a plurality of fiber material layers impregnated with a thermoplastic resin, the laminate portion impregnated with a thermoplastic resin is composed of a plurality of layers, each layer consisting of a fabric prepared from aramidic fiber yarns incorporated in a cell-like three-dimensional elastic structure matrix, which consists of thermoplastic material projections passing through the interstices of the weft and warp interlacements of the fabric and bonded with the corresponding upper and lower projections, thereby forming continuous reinforcing chains interconnected with the thermoplastic matrix portion which does not extend through said interstices and is inserted among the fabric layers; the yarns of the fabric being contained and freely encapsulated in the cells of said cell-like structure.

2. The bonded laminate according to claim 1, wherein the thickness ranges from 5 to 50 mm, at least 50% of which consisting of a plurality of fiber material layers impregnated with a thermosetting resin and less than 50% of which consisting of a plurality of fiber material layers impregnated with a thermoplastic resin.

3. The bonded laminate according to claim 1, wherein the sum $n_A + n_B$ ranges from 5 to 50 and the $n_A/n_B$ ratio ranges from 1.1 to 20, in which $n_A$ is the number of layers impregnated with a thermosetting resin and $n_B$ is the number of layers impregnated with a thermoplastic resin.

4. The bonded laminate according to claim 1, wherein the fiber material is composed of glass fibers or of man-made fibers.

5. The bonded laminate according to claim 4, wherein the fiber material is composed of high-tenacity and high-modulus man-made fibers, in particular of aramidic fibers.

6. The bonded laminate according to claim 1, wherein the fiber material is in the form of a fabric or of a felt.

7. The bonded laminate according to claim 1, wherein the thermosetting resin is an unsaturated polyester resin.

8. The bonded laminate according to claim 1, wherein the thermoplastic resin is polyethylene.

9. Armor systems for the protection against bodies endowed with a high kinetic energy and prepared from the bonded laminate as claimed in claim 1.

* * * * *